Figure 3:
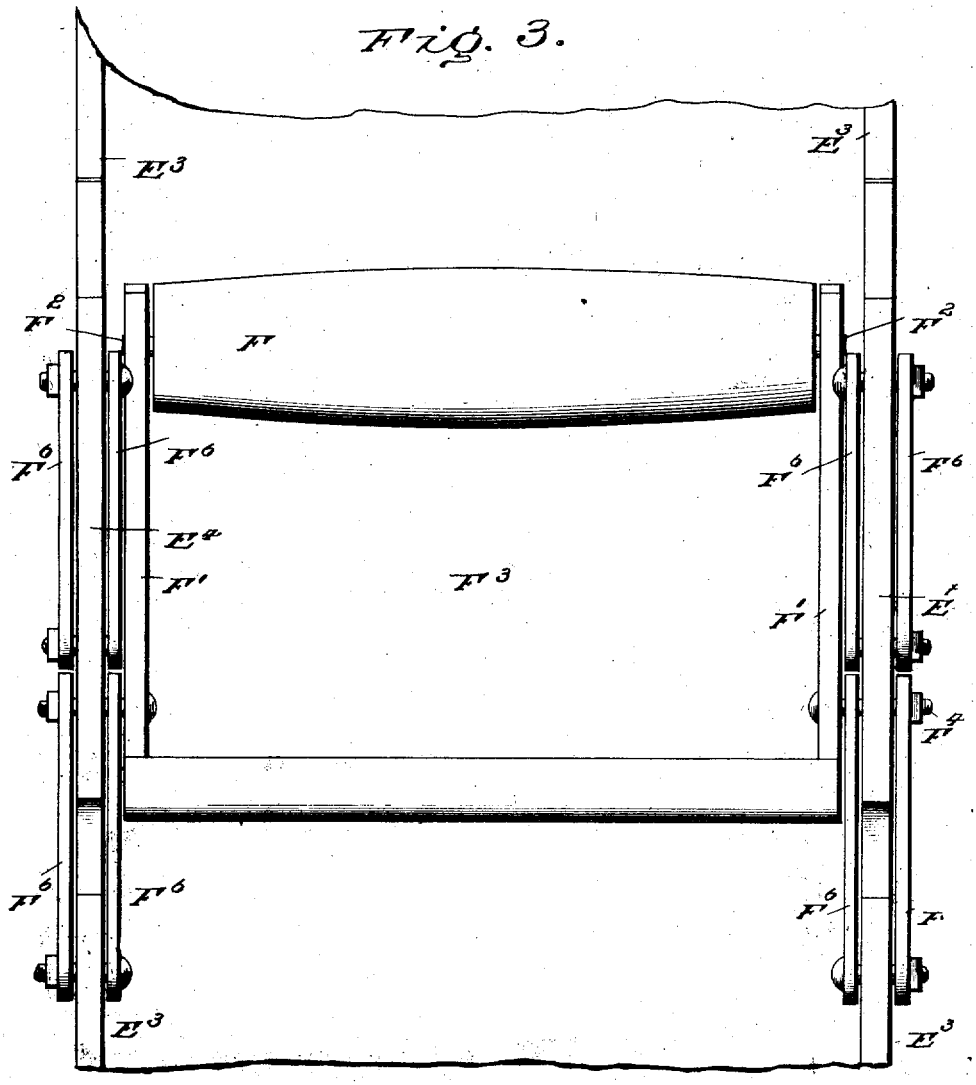

No. 11,866. Reissued Oct. 30, 1900.
F. HAGEN.
CORN SHREDDER.
(Application filed June 5, 1900.)
2 Sheets—Sheet 1.
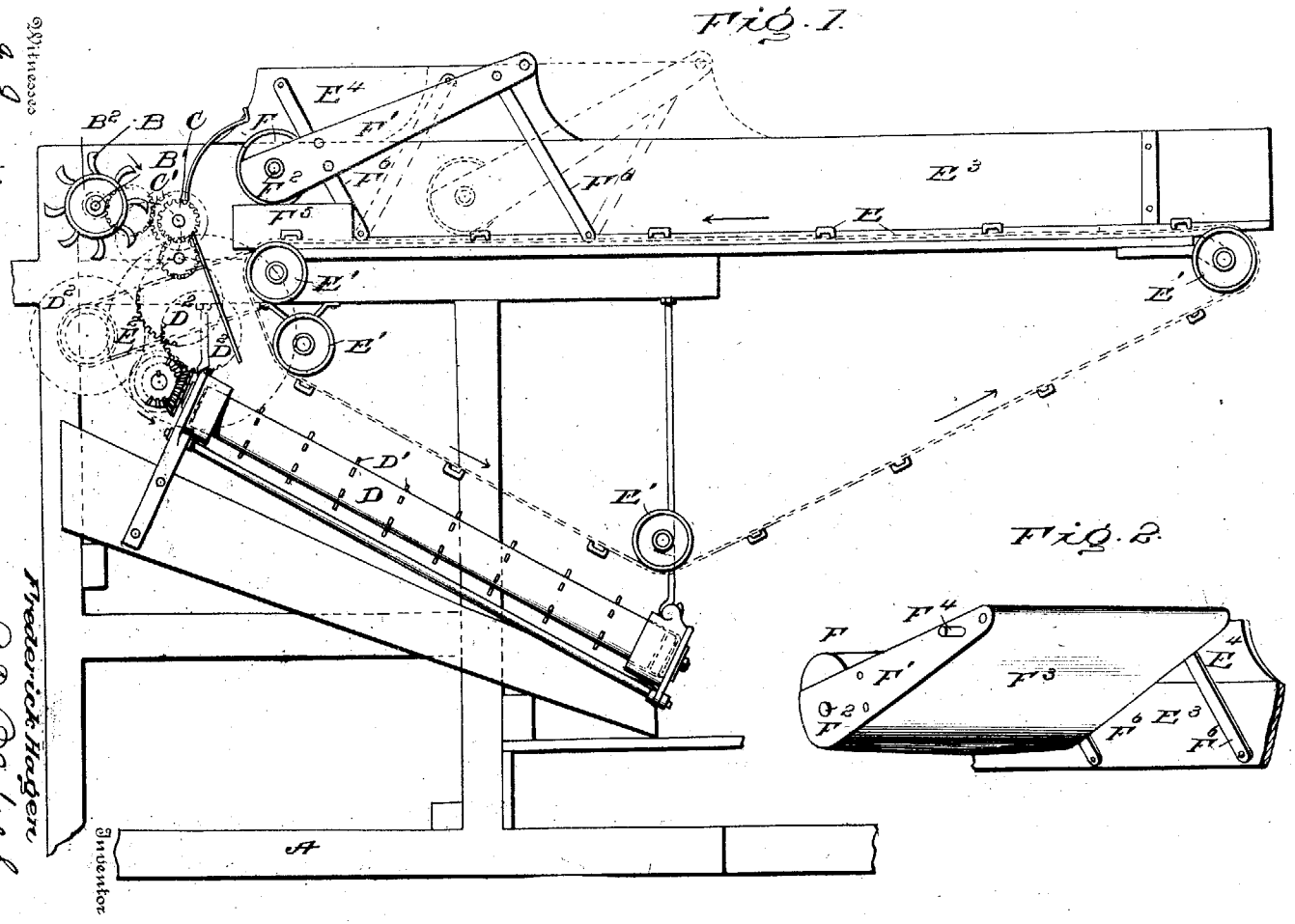

No. 11,866. Reissued Oct. 30, 1900.

F. HAGEN.

CORN SHREDDER.

(Application filed June 5, 1900.)

2 Sheets—Sheet 2.

Witnesses

Jno. Minie

Wm. J. Jacobi

Inventor

Frederick Hagen

By A. D. Sehl

Attorney

UNITED STATES PATENT OFFICE.

FREDERICK HAGEN, OF BELVIDERE, ILLINOIS.

CORN-SHREDDER.

SPECIFICATION forming part of Reissued Letters Patent No. 11,866, dated October 30, 1900.

Original No. 613,676, dated November 8, 1898. Application for reissue filed June 5, 1900. Serial No. 19,122.

*To all whom it may concern:*

Be it known that I, FREDERICK HAGEN, a citizen of the United States, residing at Belvidere, in the county of Boone and State of Illinois, have invented certain new and useful Improvements in Corn-Shredders, of which the following is a specification.

The object of this invention is the production of a corn-shredder wherein the danger of catching the hands of the operator in the mechanism is practically abolished. This result I have accomplished by attaching to the corn-shredder in common use a device by means of which the cornstalks are held down and fed evenly to the snapping-rolls, more evenly than such feeding could be done by hand, and whereby the operator is kept back from the dangerous mechanism.

My improvements consist in supporting a presser in a pivotal manner, so that it may be moved bodily toward the feeding end of the shredders in order that access may be had to the snapping-rollers and other parts of the mechanism.

In the corn-shredders in common use continuous uniformity as to quantity in feeding is practically impossible, and uneven feeding clogs the mechanism and invites the intervention of the operator's hand to remedy the difficulty. I have guarded the husking-rolls of the shredder by placing the returning (under) portion of the endless feeding-carrier just above these rolls, so that there can be no clogging at these points, the weight of the carrier pressing the ears of corn into engagement with the husking-pegs of these rolls.

In the accompanying drawings, Figure 1 is a side elevation of that portion of a corn-shredder to which my invention appertains, showing the application of my improvements thereto. Fig. 2 is a perspective view of the presser-roller and its means of connection with the shredder. Fig. 3 is a plan view of the supports.

A is the supporting-frame.

B is the shredder-cylinder, B′ its supporting-shaft, and $B^2$ the driving-pulley thereon.

C indicates the snapping-rolls for snapping the unhusked ear from the stalks as the latter are passed between the rolls. Motion is imparted to these rolls from the driving-shaft B′ by means of the intermediate gearing C′.

D represents the husking-rolls, with the husking-pegs D′ thereon, driven by the train of gearing $D^2$ from the shaft B′.

E is an endless carrier mounted on the supporting-wheels E′ and driven by the endless chain-belt connection $E^2$ with one of the gears of the train $D^2$.

$E^3$ indicates stationary side boards for the carrier E.

$E^4$ indicates movable upper side boards.

F is the presser-roller of my invention. It is largest in the middle, tapering slightly toward each end in order to spread the cornstalks evenly upon the carrier as they pass under the roller. The roller F is not positively driven, but merely rotates with the passing stalks. It is mounted in bearings in the rigid framework F′ upon the gudgeons $F^2$ at either end of the roller, the under side of the framework F′ being covered with the sheet-iron piece $F^3$. This framework F′ is pivoted in the upper side boards $E^4$, pintle $F^4$ near the end opposite the presser-roller leaving the latter free to rise and fall to accommodate itself to the varying amount of the feed.

$F^5$ is a stop-block limiting the downward movement of the roller F. This block acts merely as a rest for the pivoted framework F′ when the latter is at its lowest point.

$F^6$ represents arms pivoted near the lower edges of the stationary side boards $E^3$ of the carrier E and at their upper ends to the movable upper boards. There are two of these arms on each side of the side boards, and they permit the bodily movement of the framework F′, carrying with it the presser-roller F. Thus the framework F′ may occupy either one of two positions—to wit, the position shown by the full lines in Fig. 1 or the position indicated by the dotted lines in the same figure. The first is its operative position and the latter is the position it may be caused to assume when access to the snapping-rolls C is desirable. By the arrangement just described it will be seen that the upper side boards $E^4$, which carry the pivoted frame and presser-roller, are supported at each side above and in line with the lower side boards by parallel links loosely pivoted to the upper and lower side boards, respectively, said links being of such a length that the upper side boards rest flush and are in a position of rest upon the lower side boards only in either of the two extreme opposite positions of their movement.

In operation the cornstalks are scattered as evenly as possible upon the carrier E after motion has been imparted to the shredding mechanism and are carried thereby under the presser-roller F, which bears upon the stalks and tends by reason of its crowning form to throw the stalks from the middle of the carrier E, where they usually lie thickest, to the sides of the carrier. The position of this roller just forward of the snapping-rolls prevents the operator from placing his hands in proximity thereto and by feeding the stalks evenly to those rolls prevents clogging at this point.

The carrier E is located just above the husking-rolls D to prevent the piling up of ears of corn thereon, to hold the ears against the rolls, and to prevent the placing of the hand of the operator in contact therewith.

I claim as my invention—

1. In a corn-shredder, in combination, a supporting-frame, a shredding mechanism, a carrier for presenting the cornstalks to the shredding mechanism, lower side boards and upper side boards which latter are movably mounted over the carrier by a pair of pivotal links loosely pivoted to the upper and lower side boards respectively, and a presser carried by the upper side boards and adapted to be moved therewith, substantially as and for the purpose specified.

2. In a corn-shredder, the combination of a supporting-frame, a carrier for presenting cornstalks to a shredding mechanism, a freely-mounted presser located over the carrier and pivotally connected to the main frame, said connection permitting the presser to be moved bodily in a lengthwise direction of the main frame and supporting said presser in either of the two extreme opposite positions.

3. In a corn-shredder, the combination of a supporting-frame, a carrier for presenting cornstalks to a shredding mechanism, supplemental frames located over the main frame, a presser pivotally supported at one end to the supplemental frames, its other end being self-adjustable, and a suitable connection between the main frame and supplemental frames, said connection permitting the said supplemental frames to be moved bodily to and from the shredding mechanism and supporting the same in either of the two extreme opposite positions.

4. In a corn-shredder, the combination of a supporting-frame, a shredding mechanism, a carrier for presenting cornstalks to the shredding mechanism, supplemental frames located over the main frame and supported thereby, a presser pivotally supported at one end to the supplemental frames, its other end being self-adjustable, and links connecting the supplemental frames and main frame, the connection being such that the said supplemental frames and presser may be moved bodily to and from the shredder mechanism and supported in either of the two extreme opposite positions of their movement.

5. In a corn-shredder, the combination of a supporting-frame, a shredder mechanism, a carrier for presenting cornstalks to the shredder mechanism, a pivotally-mounted presser supported over the carrier, and a movable connection between said main frame and presser, permitting the latter to be moved to and from the shredder mechanism.

6. The combination of a supporting-frame, a shredding mechanism E, a frame including side boards $E^3$ secured to the main frame, a carrier between said side boards, a pair of upper side boards normally resting upon the side boards E and connected to each other by a framework F′, and a shield $F^3$, a presser-roller F, stop-blocks secured to said side boards $E^3$ to support the framework F′ and prevent the roller from falling into contact with the carrier, and two pairs of links each pivoted at one end to the side boards $E^3$ and at the other end to the upper side boards $E^4$, and of such a length as to permit the presser to rest either in normal position and yield to excess of feed, or to be drawn back and at the other end of its movement to rest on the side boards $E^3$ out of the way to permit access to the shredding mechanism.

FREDERICK HAGEN.

Witnesses:
A. O. BEHEL,
E. BEHEL.